(12) United States Patent
Kimbrough

(10) Patent No.: US 6,977,334 B2
(45) Date of Patent: Dec. 20, 2005

(54) METHOD OF WRITING KEYBOARD MUSIC

(76) Inventor: Timothy Kimbrough, 5409 Riverdale Rd., Apt. # A-4, Riverdale, MD (US) 20737

(*) Notice: Subject to any disclaimer, the term of this patent is extended or adjusted under 35 U.S.C. 154(b) by 124 days.

(21) Appl. No.: 10/671,512

(22) Filed: Sep. 29, 2003

(65) Prior Publication Data

US 2005/0066795 A1 Mar. 31, 2005

(51) Int. Cl.$^7$ ............................................... G09B 15/00
(52) U.S. Cl. .................... 84/483.1; 84/483.2; 84/485 R; 84/470 R
(58) Field of Search ........................... 84/483.1, 483.2, 84/485 R, 470 R

(56) References Cited

U.S. PATENT DOCUMENTS

| | | | | |
|---|---|---|---|---|
| 1,473,495 A | * | 11/1923 | Miller | 84/483.2 |
| 2,232,264 A | * | 2/1941 | Petersen | 84/483.1 |
| 2,360,534 A | * | 10/1944 | Allen | 84/483.1 |
| 5,685,724 A | * | 11/1997 | Bubar | 434/430 |
| 5,998,720 A | * | 12/1999 | Beatty | 84/470 R |

* cited by examiner

Primary Examiner—Shih-Yung Hsieh
(74) Attorney, Agent, or Firm—Timothy Kimbrough

(57) ABSTRACT

A unique method of writing keyboard music without the use of traditional lines and staff notation is provided.

The method is primarily designed to represent elementary R & B, Jazz and Gospel keyboard music, but is not limited to such. The invention consists of a column with two sides to it within which music played with the right hand is written in the right region of the column, and music played with the left hand is written in the left region of the column.

The method is distinguished by very specific easy to learn rules on exactly how certain fundamental keyboard concepts are written using the column. The following keyboard concepts are indexed by the invention. They are: bass notes, piano chords, lone piano notes, sustaining chords, chord alternatives, nipping two piano notes at the same time, keyboard octaves, rhythms, key signatures and tempos and song headings. In essence, the invention makes reading piano music much easier and more enjoyable so that beginner, intermediate and advanced pianists benefit richly from it.

1 Claim, 12 Drawing Sheets

AMAZING GRACE    C-MAJOR

| LEFT HAND | BEATS | RIGHT HAND | LEFT HAND | BEATS | RIGHT HAND |
|---|---|---|---|---|---|
|  | 1 |  | A ↓↓ | 1 | E, A, C ↓ ↓ m |
|  | & |  |  | & |  |
|  | 2 |  |  | 2 |  |
|  | & |  |  | & |  |
|  | 3 | G ↓ |  | 3 | E ↑ |
|  | & |  |  | & | C m |
| C ↓↓ | 1 | E, G, C ↓ ↓ m | F# ↓↓ | 1 | E ↑ |
|  | & |  |  | & |  |
|  | 2 |  |  | 2 |  |
|  | & |  |  | & |  |
|  | 3 | E ↑ C m | D ↓↓ | 3 | F#, A, C, D ↓ ↓ m ↑ |
|  | & |  |  | & |  |
| E ↓↓ | 1 | B♭, C, E ↓ m ↑ | G ↓↓↓ | 1 | B, D, F, G ↓ ↑ ↑ ↑ |
|  | & |  |  | & |  |
|  | 2 |  |  | 2 |  |
|  | & |  |  | & |  |
|  | 3 | D ↑ | F ↓↓ | 3 | E ↑ |
|  | & |  |  | & | F ↑ |
| F | 1 | F, A, C ↓ ↓ ↓ | E ↓↓ | 1 | C, E, G m ↑ ↑ |
|  | & |  |  | & |  |
|  | 2 |  |  | 2 |  |
|  | & |  |  | & |  |
| F# ↓↓ | 3 | C, E♭, F#, A ↓ ↓ ↓ ↓ |  | 3 | A ↑ |
|  | & |  |  | & |  |
| G ↓↓ | 1 | C, E, G ↓ ↓ ↓ | C ↓↓ | 1 | B♭, C, E ↓ m ↑ |
|  | & |  |  | & |  |
|  | 2 |  |  | 2 |  |
|  | & |  |  | & |  |
| G ↓↓ | 3 | D, F#, A ↓ ↓ ↓ |  |  |  |
| A♭ ↓↓ | & | D, F, A♭, B ↓ ↓ ↓ ↓ |  |  |  |

FIGURE 10a

TEMPO – SLOW TO MODERATE SPEED

| LEFT HAND | BEATS | RIGHT HAND | LEFT HAND | BEATS | RIGHT HAND |
|---|---|---|---|---|---|
| E | 3 | E, B♭, D | | | |
| ↓↓ | & | ↓ ↓ ↑ | | | |
| F | 1 | F, A, C | | | |
| ↓↓ | & | ↓ ↓ m | | | |
| | 2 | | | | |
| | & | | | | |
| F♯ | 3 | C, E♭, F♯, A | | | |
| ↓↓ | & | ↓ ↓ ↓ ↓ | | | |
| G | 1 | C, E, G | | | |
| ↓↓ | & | ↓ ↓ ↓ | | | |
| | 2 | | | | |
| | & | | | | |
| A♭ | 3 | D, F, A♭, B | | | |
| ↓↓ | & | ↓ ↓ ↓ ↓ | | | |
| A | 1 | E, A, C | | | |
| ↓↓ | & | ↓ ↓ m | | | |
| | 2 | | | | |
| | & | | | | |
| F | 3 | A♭, C, D, F | | | |
| ↓↓ | & | ↓ m ↑ ↑ | | | |
| G | 1 | G, C, E | | | |
| ↓↓ | & | ↓ m ↑ | | | |
| | 2 | | | | |
| | & | | | | |
| B | 3 | F, B, D | | | |
| ↓↓ | & | ↓ ↓ ↑ | | | |
| C | 1 | E, G, C | | | |
| ↓ | & | ↓ ↓ m | | | |
| | 2 | | | | |
| | & | | | | |
| | 3 | | | | |
| | & | | | | |

| LEFT HAND | BEATS | RIGHT HAND |
|---|---|---|
| | 1 | |
| | & | |
| | 2 | |
| | & | |
| | 3 | |
| | & | |
| | 4 | |
| | & | |
| | 1 | |
| | & | |
| | 2 | |
| | & | |
| | 3 | |
| | & | |
| | 4 | |

MISTY        C - MAJOR        TEMPO - MODERATE

METHOD OF WRITING KEYBOARD MUSIC

BACKGROUND OF THE INVENTION

1. Field of the Invention

This invention relates generally to playing keyboard music, and more specifically to a new method of writing keyboard music without utilizing the traditional lines and staff notations.

2. Prior Art

The most common and widespread method of representing keyboard music is the traditional lines and staff approach. The traditional lines and staff method serves the needs of many keyboard players very well and enables the keyboard players that are trained in it a broad range of musical expressions from the simple to the complex.

The historical utility of traditional lines and staff notation is certainly evident as seen in the powerful Sonatas and orchestrations composed by classical artists like Mozart, Ludwig von Beethoven and Chopin. However, despite the enormous benefits of the lines and staff method it does have its drawbacks. The first drawback is the fact that the lines and staff method is by its very nature very technical, and this technical aspect makes mastering the method a tedious and cumbersome task, especially for young learners. The U.S. Pat. No. 5,998,720 issued to Beatty draws attention to the fact that many young children have difficulty learning the lines and staff method even when it is presented to them on charts and attractive color schemes, and Beatty also refers to the lines and staff concept as being too "complex" for some children to learn.

The problems mentioned so far may account for why so many young people become discouraged and drop out of keyboard training so early in the game. Another inherent weakness in the traditional method is that in the past it has been taught to many people without regard for ear training, but with an overemphasis on rigor.

The U.S. Pat. No. 5,685,724 issued to Bubar makes mention of the Suzuki method in Suzuki's attempts to teach ear training utilizing the traditional lines and staff approach, but surprisingly Bubar concludes that Suzuki's employment of the traditional method many times made ear training a tedious process.

BRIEF SUMMARY OF THE INVENTION

It is the objective of this invention to provide an easy-to-follow, non-technical method of writing keyboard music that does not employ the use of lines and staff notation. The method, which consists primarily of a column with 2 sides to it, the right side containing music to be played with the right hand, and the left side containing music to be played with the left hand is an easy-to-follow tool for both novice and experienced keyboard players. In the right column the individual notes that make up the right hand chord are written out, separated by commas respectively, and the left column contains any single bass note that is to be played along with the right hand chord. The reader of the music need only play exactly what is written in the right column along with what is written in the left column, simultaneously. The method provides a system of notation on how to represent alternative chord and bass note ideas, sustained chords and bass notes, playing lone piano notes, nipping two piano notes simultaneously, playing left handed piano chords, the keys for the music, tempo, location of chords relative to middle C on the keyboard, rhythm and song titles.

The invention is characteristically non-tedious and easy to master. A secondary objective of the invention is to instill a sense of confidence into those using the method as they experience playing their favorite music with ease. Hopefully, this sense of confidence will encourage pianists to venture into more complex piano ideas such as jazz improvisation.

BRIEF DESCRIPTION OF THE DRAWINGS

FIG. 11 is an example of how to write the entire song, "AMAZING GRACE," utilizing the tools of the invention.

FIG. 12 is an example of how to write a small portion of Duke Ellington's "MISTY" by utilizing tools of the invention.

DETAILED DESCRIPTION OF THE INVENTION

Figure 1:
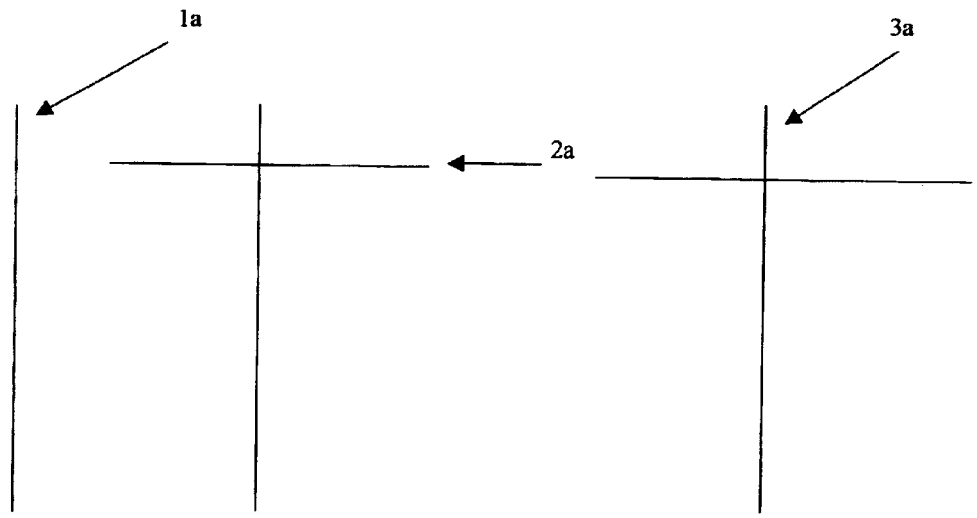
FIG. 1 contains the lines to draw to construct the invention column.
Figure 2:
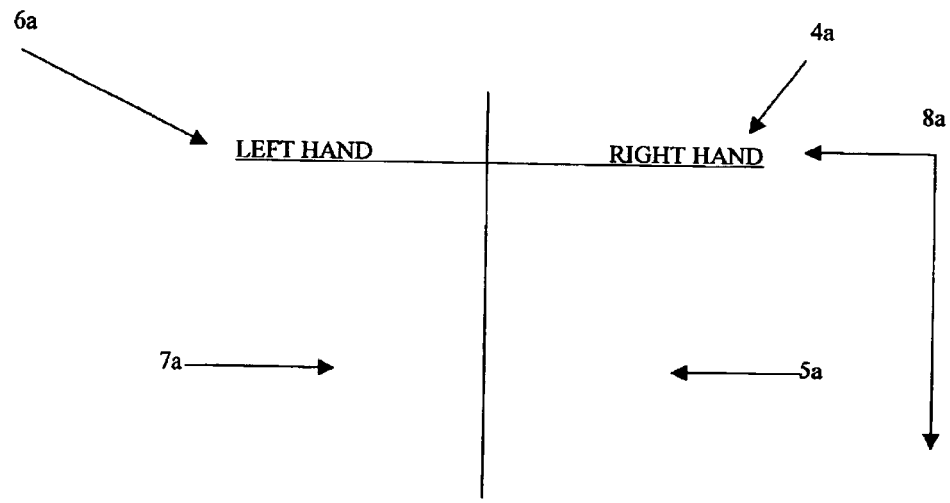
FIG. 2 is an example of how to properly label the invention; and in what direction the information is read from the columns.

Referring to FIG. 1, a vertical line 1a is drawn, then a horizontal line 2a is drawn across the vertical line 1a to form a column 3a. Referring to FIG. 2, the right top of the column 4a is labeled, "RIGHT HAND", directly under this heading all piano notes and chords will be written which will be in the area 5a. The top left side of the column is labeled, "LEFT HAND", 6a and under 6a will be written all low bass notes, left handed 2 or 3 note piano chords, and single left handed piano notes, which will appear in the area 7a. All information from the columns is read from the right to the left, then downward as indicated by 8a. Now the detailed description of the invention will explain and illustrate how piano chords, bass notes, single piano notes and various musical commands are represented using the invention's method.

Figure 3:
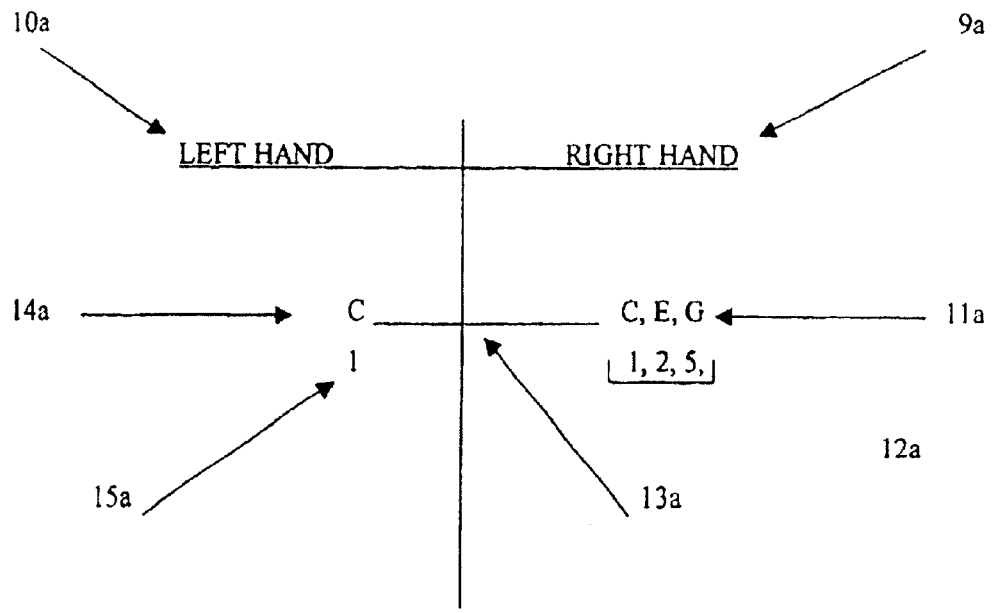
FIG. 3 is an example of how to represent music using the invention.

Referring to FIG. 3, a sample 3-note piano chord is written under the RIGHT HAND column 9a. The 3 note piano chord 11a is the combination of the 3 piano notes C, E and G.

The suggested fingers to use for playing the chord are 12a, which are the #1 or thumb for the C note, the #2 or forefinger for the E note and the #5 or little finger for the G note. The horizontal bar 13a serves more than one purpose.

Its primary function is as an indicator to show that a particular low bass note is to be played along with a particular right hand chord or piano note; with this in mind it can be nicknamed a "bass bar". Second, it serves to give the musical experiences written under the chord and bass columns a tiny sense of timing; a way to measure beats from one chord to another.

Finally, the absences of this bass bar would indicate that any single piano note appearing in the left column is a higher pitched, non-low sounding piano note, but more will be said on this topic later on in the description. In the case of FIG. 3 the single bass note 14a is to be played at the same time as the piano chord 11a. The suggested finger to use to play bass note 14a is finger 15a, the thumb on the left hand. Suggested fingers to use are purely optional, and may or may not be included under or next to chords and single notes. They are written only to aid the person playing the music piece who is probably a beginner pianist.

Figure 4:
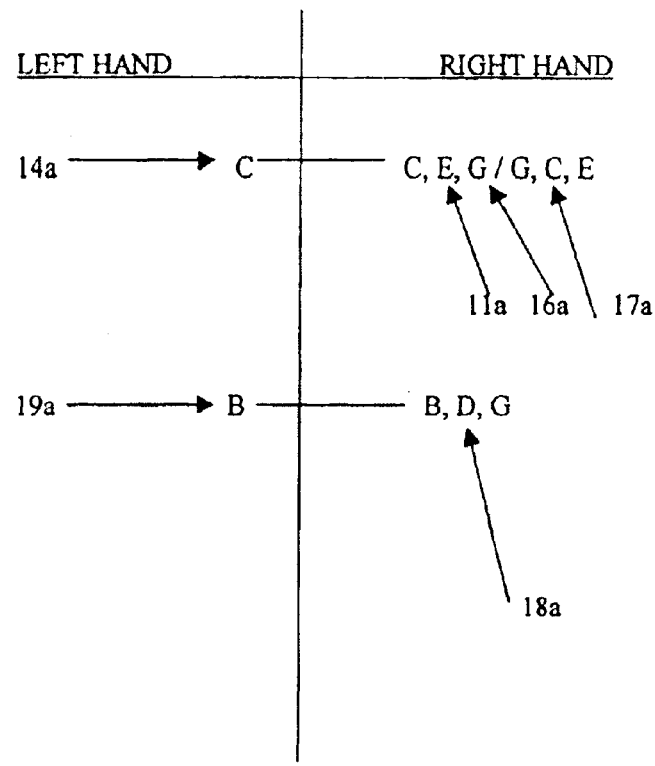
FIG. 4 is an example of how to represent various music using the invention.

The other purpose for recommending certain fingers is to ensure movement from chord to chord so as to enrich the sound quality of the music piece being played. In FIG. 4 the slanted bar 16a means that the chord 11a or the alternative chord 17a could be played over the bass note 14a.

Figure 5A:
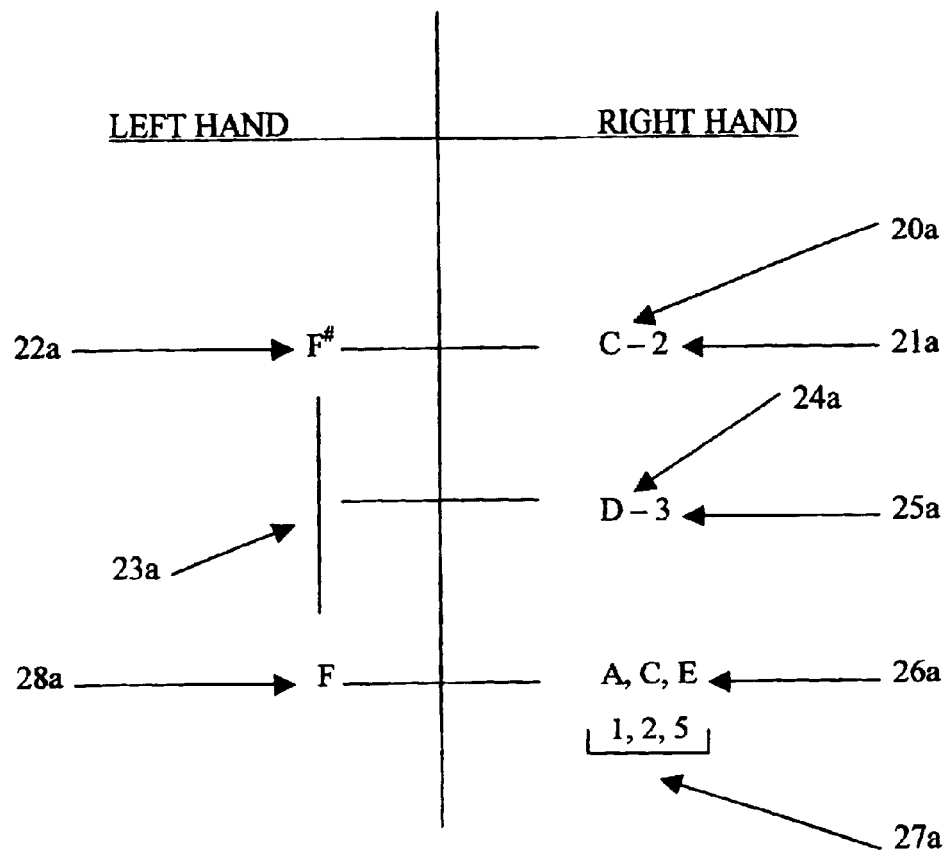
FIG. 5a is an example of how to represent various music using the invention.

Next, the 3 note piano chord 18a is played along with the bass note 19a. In FIG. 5a we see how a musical experience is sustained or held. In FIG. 5a the single piano note 20a is to be played using the suggested finger 21a, the forefinger; as the single note 20a is hit the bass note 22a is struck and is to be sustained as indicated by the vertical bar 23a during which time the single note 24a is hit with the suggested finger 25a, the middle finger.

Figure 5B:
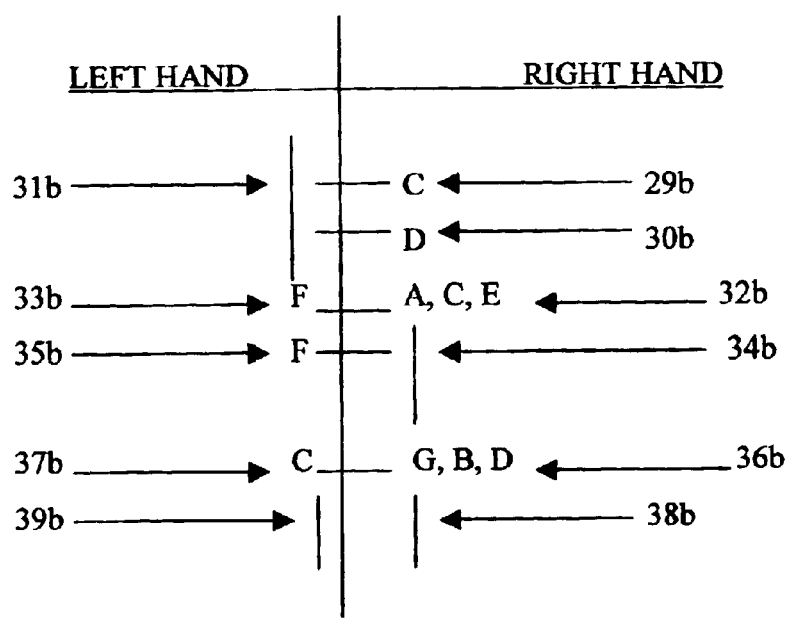
FIG. 5b is an example of how to represent various music using the invention.
Figure 5C:
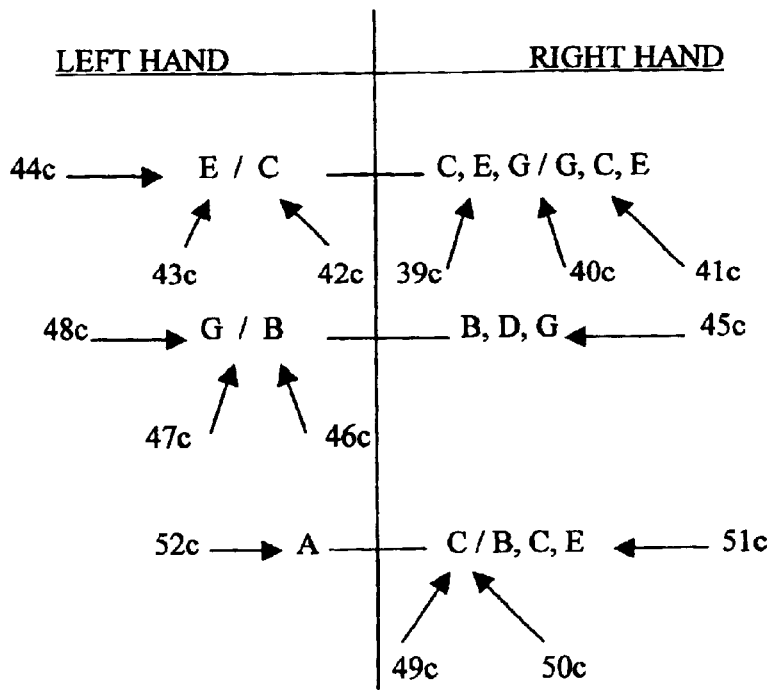
FIG. 5c is an example of how to represent various music using the invention.

Finally, the chord 26a is played with the fingers 27a accompanied by the low bass note 28a. The vertical bar 23a is the notation used to either sustain a musical experience, or it indicates that no music is to be played over a certain measure; in simpler language the vertical line means either, sustain something, or means, at this point in the song over the vertical bar's "do nothing". In FIG. 5b the vertical bar's flexibility is illustrated. The right hand piano notes 29b and 30b are hit one after the other during which time the vertical bar 31b indicates that the LEFT HAND plays absolutely nothing. Next, the right hand chord 32b is hit and to be sustained as indicated by 34b. When the chord 32b is struck the left hand low bass note 33b is hit, then hit again 35b while the chord 32b is being held. Finally, the chord 36b is hit with the bass note 37b, the vertical bars 38b and 39b direct the player of the music to hold 36 and 37b for a little while. The slanted bar 16a in FIG. 4 that offers single note, bass and chord alternatives has universal applications that can be illustrated in FIG. 5c. The 3 note piano chord 39c can be played but the slanted bar 40c indicates that the alternative chord 41c could be played instead of 39c.

Figure 6:
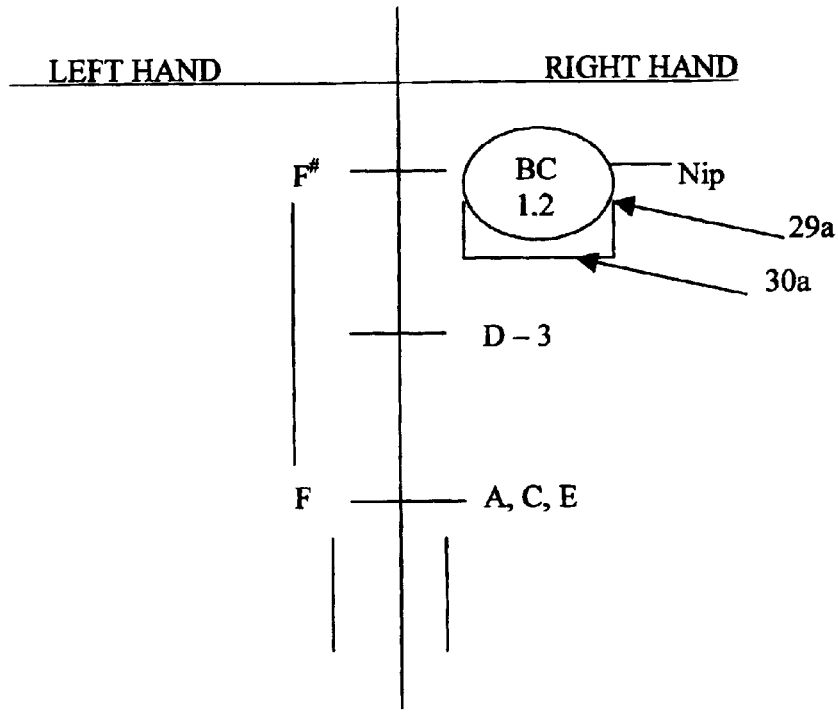
FIG. 6 is an example of how to represent various music using the invention.

The low bass note 42c can be played with either chord 39c or 41c, or the bass note 44c can be played in the place of 42c; this option was made possible by the alternative slanted notation 43c. Next, the right hand chord 45c is hit and either of the low bass notes 46c or 48c may accompany the right hand chord; and the bass note options were made possible because of the alternative bar 47c. Finally, the single piano note 49c or the 51c chord may be struck; the option was indicated by the alternative bar 50c. FIG. 6 illustrates how to nip two piano notes quickly in a fancy, jazzy fashion. Referring to FIG. 6, the individual piano notes B, then C labeled 29a are to be nipped with the suggested fingering for both, 30a, which will be the thumb for the B and the forefinger for the C note. 29a is exactly the way that this kind of musical experience is to be represented by the invention; the two piano notes are to be written close together with the first note slightly higher than the other note, with a full circle around both notes and the word "nip" attached by a horizontal line to the circled notes; suggested finger numbers, however, are optional and don't have to be in the representative for nipping piano notes.

In the Background and Brief Summary for this invention, it was established that the invention is primarily an alternative means for beginners to experience playing elementary Jazz, R & B and Gospel piano music. Up to this point we have assumed that the horizontal bar defined by example 13a in FIG. 3 would always indicate a low bass note, unless otherwise noted, and in all of our Figures and examples so far, they've all been low bass note illustrations. The invention does have some "rules of thumb" that are built into it, and they have special significance at this point in the description. Students are admonished to adhere to the following:

Rules for Playing Right Hand Chords

1. Always play right-handed chords that have 3 piano notes using fingers 1, 2, 5. For example: C, E, G
   1, 2, 5 (fingers to use)
2. Always play piano chords near the middle "C" note of the keyboard. Middle "C" is the white "C" note dead center in the middle of the piano keyboard.
3. Always play piano chords that have 4 piano notes using fingers 1, 2, 3, 5. For example: C, E, G, B
   1, 2, 3, 5 (fingers to use)
4. When moving from chord to chord always start each chord with the closest thumb note to where you just left off. Do not hop and jump all over the keyboard, keep your chords in the same neighborhood unless otherwise directed.

Rules for Playing Bass Notes

1. Always play bass notes with your left hand.
2. Unless otherwise directed, the horizontal bar in the music notation means to play a low-pitched bass note to accompany what's being played in the "RIGHT HAND" column.
3. Always play bass notes using the finger located closest to the bass note to be played.
4. Rule #3 means that you use a seesaw type motion to move from one bass note to the other.
5. Never lift your hand off of the piano to play bass. Doing so will cause you to hit unwanted notes and force you to take your eyes from your right hand chord activity.

Horizontal Bar Rules

1. The horizontal or "bass bar" helps as an index in writing the music in the piece.
2. The bar, unless otherwise notated, means to play a low pitched bass note with your left hand.
3. If the bass note to be played has a middle "C" notation, play the exact bass note indicated by the middle "C" notation. (Middle "C" to be discussed later on.)
4. If there is no bass bar drawn, then the note to be played with the LEFT HAND is high pitched, a non-low sounding piano note as an accompaniment to the right hand chord.

The scenario mentioned under the Horizontal Bar Rules along with the middle "C caption will now be explained.

Figure 7:
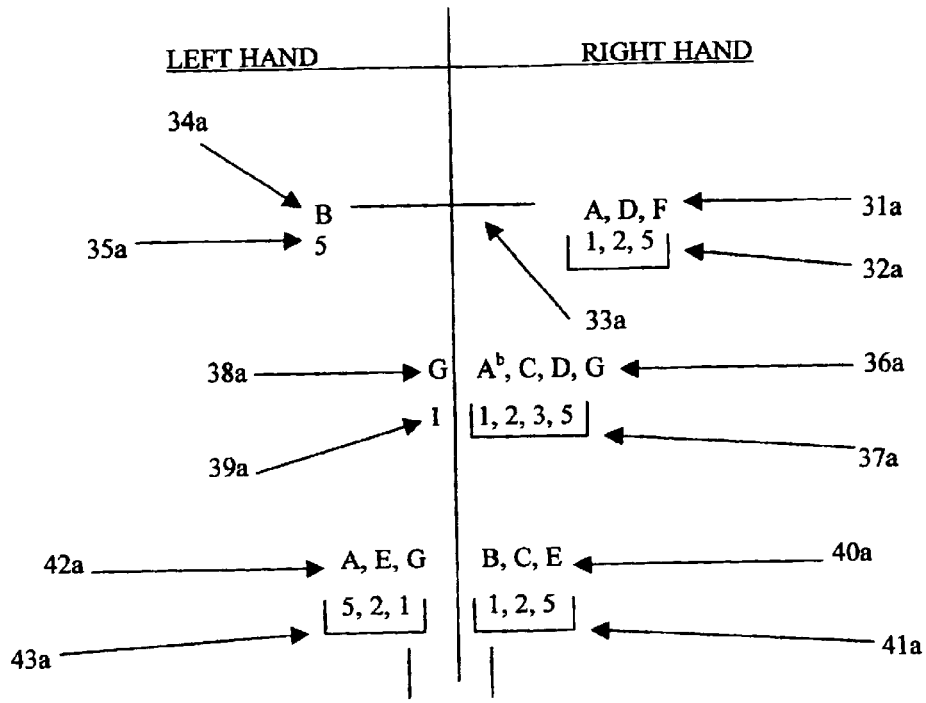
FIG. 7 is an example of how to represent various music using the invention.

In FIG. 7 the example opens up with a typical 3 note piano chord 31a with the rules for playing right handed chords finger numbers 1, 2, 5, indexed by 32a. In this scenario we insist that this chord be played in the region near middle "C" on the piano keyboard. The horizontal bar 33a indicates that the bass note 34a be a low pitch bass note and be hit using finger 35a which happens to be the little finger.

Next, the right-handed chord 36a is hit and in keeping with the rules for right hand chords the fingers 37a are used. The right hand chord 36a has no accompanying low bass note to be played along with it, indicated by the omission of the horizontal bar. In the place of a low pitched bass note a "G" note, 38a is to be played using the finger 39a, which is the thumb. If the rules for playing right hand chords and the rules for playing bass notes are adhered to in FIG. 7 then the "A" note in chord 31a would be "A" closest to middle "C", it being the one just below middle "C". The low bass note would be "B" note an octave below middle "F" because this particular "B" bass note which is hit with the little finger is best suited to allow a see-saw like swing from that "B" to a higher "G" note to help form a beautiful sounding "5" note piano chord combination; as the thumb rests on the "G" note right next to the right hand on the "A$^b$" note, "thumb to thumb".

Finally, the 3 note right hand chord 40a is hit with the chord rule fingers 41a. Once again, the omission of the horizontal bar spells the absence of a low-pitched bass and the presence of a higher pitched note on the vertical. In this case the same "G" note is hit and an "E" an "A" note to form the chord 42a. The fingers to use are 43a, and the resulting "6" note combination of left and right hand chords 42a and 40a emanate a rich dissonant jazz sound. Examples 36a, 38a, 40a and 42a are precise examples of how chord combinations without the use of a horizontal bar are to be represented. A single note such as 38a is to always hit or hug the vertical separator at at least one point.

For all 3 or 4 note piano chords whether they are left or right handed their thumb note or lead note must hit or hug the vertical line at at least one point, e.g., the A$^b$, and G notes in examples 36a, 40a and 42a respectively.

Another tool of the invention is a special notation system used to index exactly where on the keyboard to hit certain representations.

With this special tool the student doesn't have to be familiar with the traditional concept of octaves, but only needs to know the piano note names and where the middle "C" note is on the keyboard. Also the student needs to be aware that piano notes to the right of the middle "C" note go higher in pitch and that piano notes to the left of middle "C" tend to go lower in pitch. Last but not least, it will be helpful to keep in mind the invention's rules for playing right hand chords and the rules for playing bass notes. Since the tool being used utilizes middle "C" as its center piece the method will be named the Middle "C" Notation System".

Figure 8:
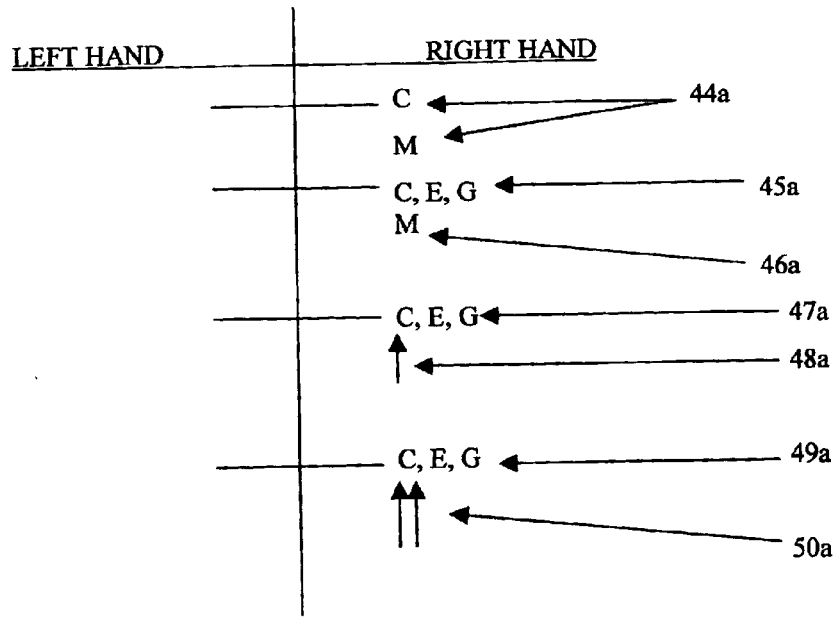
FIG. 8 contains drawings to use a middle "C" concept in the invention.

Referring to FIG. 8 the middle "C" note 44a is tagged by placing the large letter "M" under it. The chord 45a is written with the large "M" 46a under the "C" note to indicate that this chord is built from the middle "C" note. The next example, chord 47a has an arrow pointing upward directly under the "C" note, 48a. This single arrow means that the first "C" note to the right of, or higher than the middle "C" is being represented in chord 47a. In traditional terminology 48a would be the "C" note exactly one octave to the right or higher than the middle "C" note.

Figure 9A:
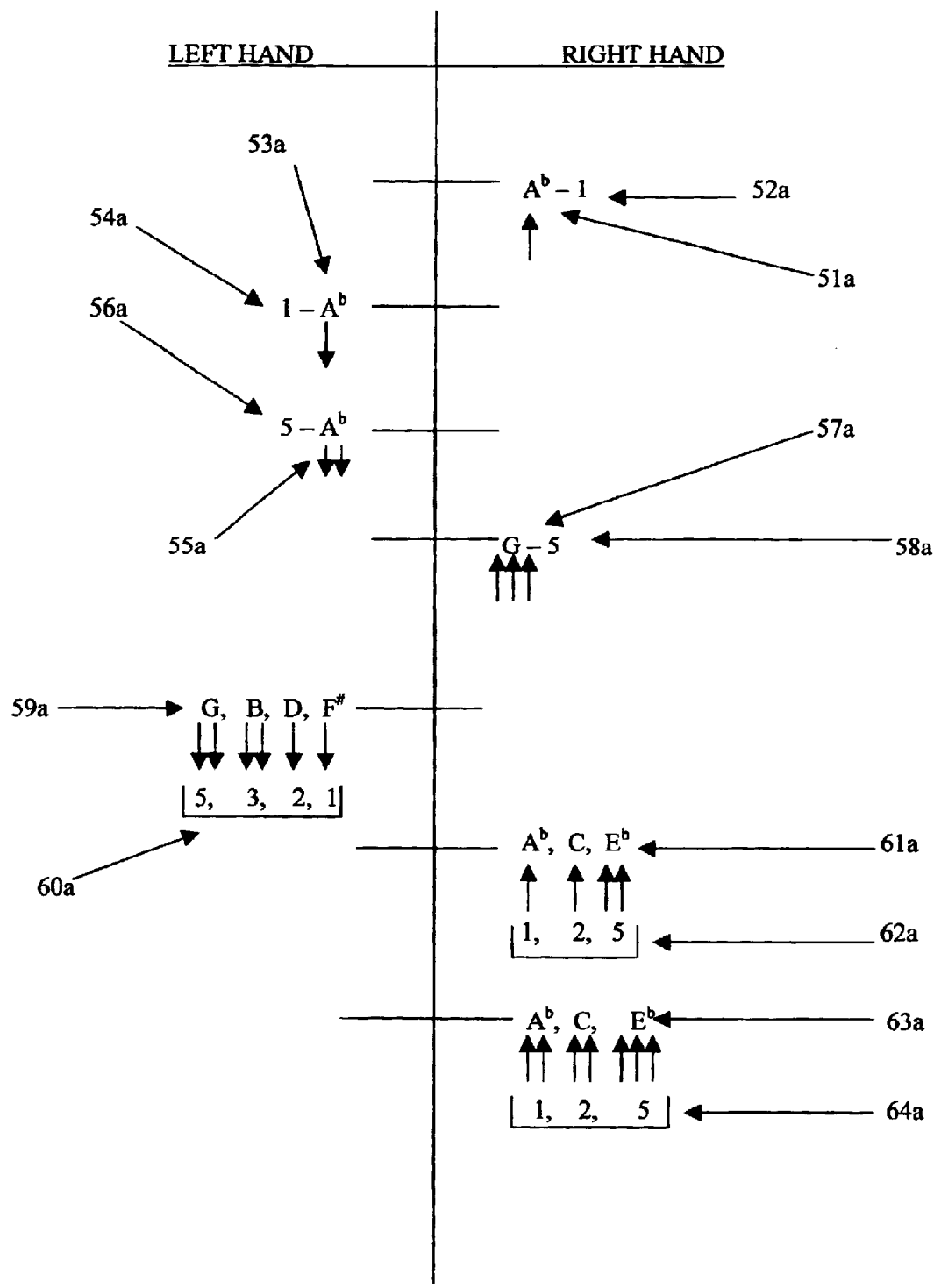
FIG. 9a is an example of how to represent various music using the invention.

Next the chord 49a has a "C" note 50a represented by 2 arrows pointing upward. The "C" note 50a is the "C" note exactly 2 away from middle "C" to the right of the middle "C", but in traditional terms, which the student need not know, 50a is exactly 2 octaves from the middle "C" to the right. Consider the following examples. In FIG. 9 the single arrow below the piano note 51a indicates to strike the "A$^b$" note to the right of middle "C" with the finger 52a. The left hand note 53a with one arrow pointing downward indicates to hit the first "A$^b$" note to the left of middle "C" with the finger 54a.

The next left hand single note 55a is to be the "A$^b$" note exactly 2 to the left of the middle "C" as indicated by the 2 arrows pointing downward, using the suggested finger 56a. Next we have a single piano note 57a which will be the "G" note located exactly 3 "G" notes to the right of the middle "C" note as indexed by the 3 arrows pointing upward and using recommended finger 58a.

In this next example we have a left hand chord 59a using a complete representation of the middle "C" notation concept. Every note of the chord 59a is tagged. They are as follows: the second "G" note to the left of middle "C", the second "B" to the left of middle "C", the first "D" to the left of middle "C" and the first "F$^\#$" to the left of middle "C", with suggested fingering 60a. Example 61a is a right hand chord fully notated by middle "C" indices and suggested fingers 62a. Please note the comparison between chords 61a and 63a; chord 61a has exactly one arrow less per piano note respectively. By inspection one may notice that the two chords are in terms of traditional terminology, one octave apart. The invention has a rhythm system to enable a student to know on what exact beats to hit chords and bass notes.

A few comments are in order before the rhythm system is discussed. First, the rhythm system just like the suggested fingering notation is not always used, rather it is used on occasions when a student needs extra aid in grasping the general rhythm for the song. Second, it is the policy of the invention to try to keep things as simple as possible.

Whenever feasible most songs are written using as few special instructions, lines, arrows, beats or anything else that would tend to distract the student from focusing full attention on playing the essence of the musical piece which are usually the chord progressions. Finally, since the horizontal bass bar assists in keeping the rhythm for some musical pieces, especially for R & B techniques, it is not necessary to include beats in many situations.

Figure 9B:
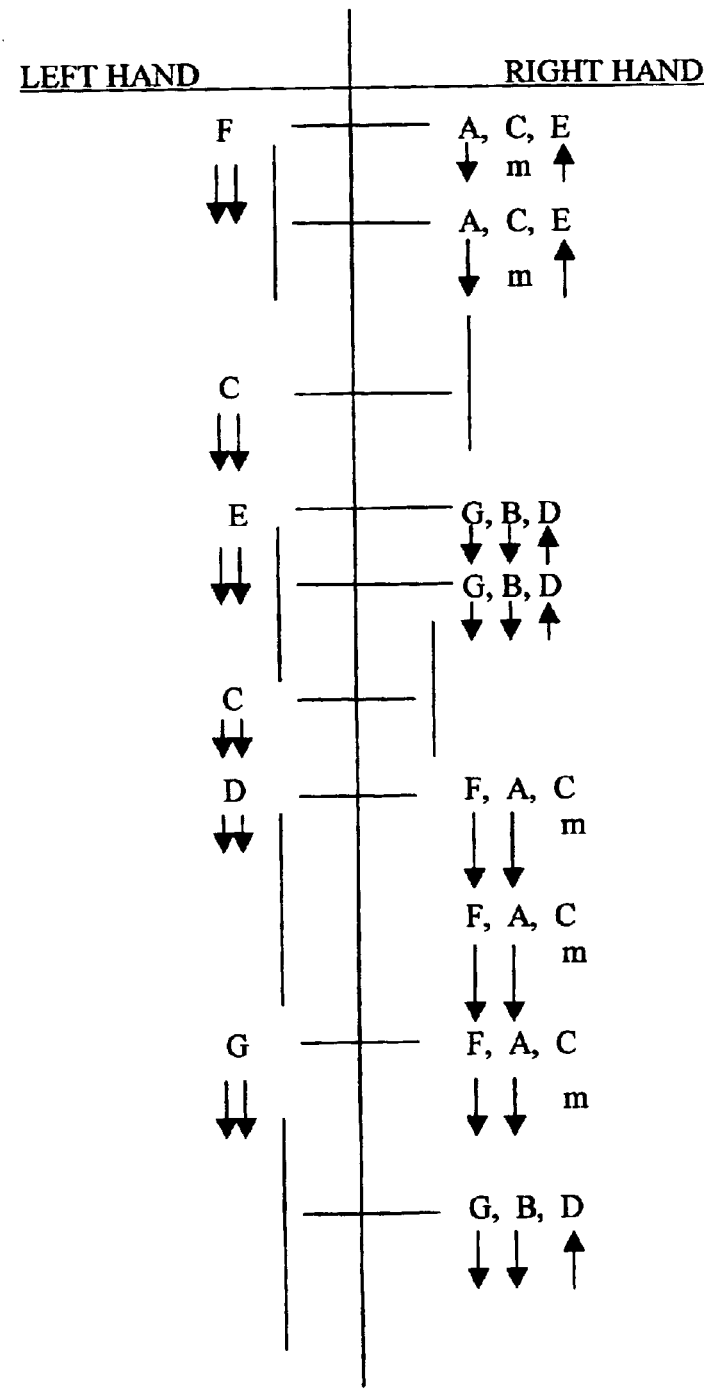
FIG. 9b is an example of how to represent a small part of an actual R & B song utilizing the invention's method.

To illustrate this point refer to FIG. 9b. In this example a small portion of the very popular R & B hit song ALL ABOUT LOVE is written using the invention. The tempo for the song is approximately a moderately slow pace pitched for C-major, as the instructions indicate. By playing the sample, it immediately becomes apparent that there is a sort of built-in rhythm in the song. If it's not apparent to the reader early in the sample, just keep playing the piece over and over again and it will become apparent to the player of the song during the repeat process.

Figure 10:
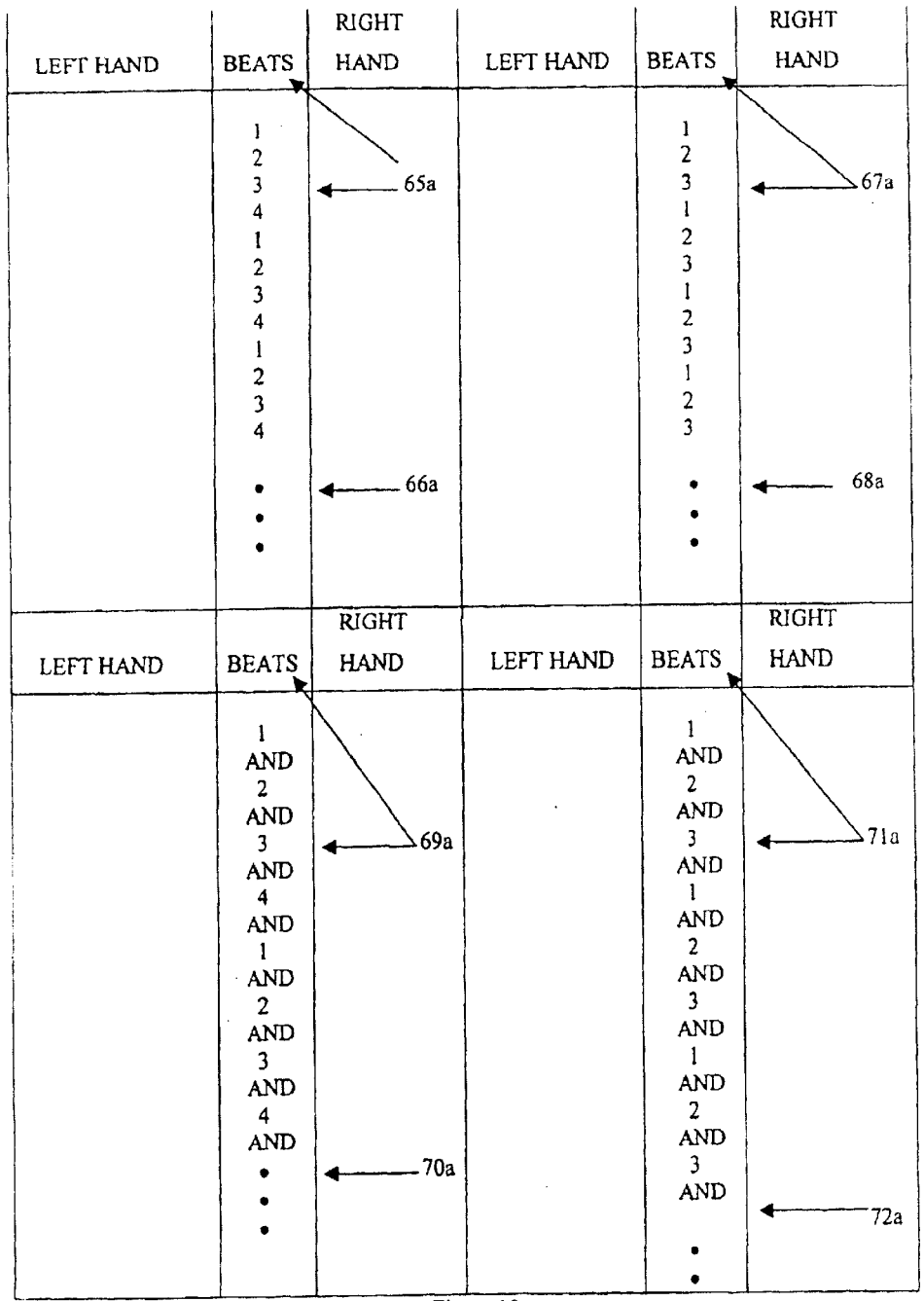
FIG. 10 contains drawings to use a "Beats" concept in the invention.

Referring to FIG. 10 four samples of the rhythm system are given which are 65a, 67a, 69a and 70a respectively.

For example 65a indicates a 1, 2, 3, 4 . . . beat and 67a depicts a 1, 2, 3, 1, 2, 3 . . . beat. As always the convention is to draw columns and label the right and left sides RIGHT HAND and LEFT HAND respectively, but because of the beats to be indicated a center column labeled BEATS is included between the RIGHT HAND and LEFT HAND columns, see FIG. 10 examples. Also after a series of beats are included under each BEATS heading there are 3 dots, see examples 66a, 68a, 70a and 72a. The three dots that appear in each BEATS column mean, "and so on", to continue the beats as established, keeps the same rhythm pattern throughout the remainder of the song; and the set beats on which to hit chords and bass notes are to continue without changing: For example if chords with bass notes are hit on the one and four beats then the 3 dots indicate that the chords and bass notes are to continue to be struck only on the one and four beats continuously throughout the remainder of the song. In FIG. 11 the well-known hymn AMAZING GRACE is written out pitched for the key of C-major and very clearly illustrates the utility of the beats system and a number of other tools of the invention previously discussed throughout the description of the invention. The reader of the song need only count the beats out loud and hit the piano notes bass and/or chords exactly on the written beat in the center column. The piece in FIG. 11 is enhanced by the application of the sustain and middle "C" notation concepts. If there are any questions as to how to play any part of FIG. 11 please refer to the body of the detailed description of the invention that discusses that particular part of the invention.

Figure 12:
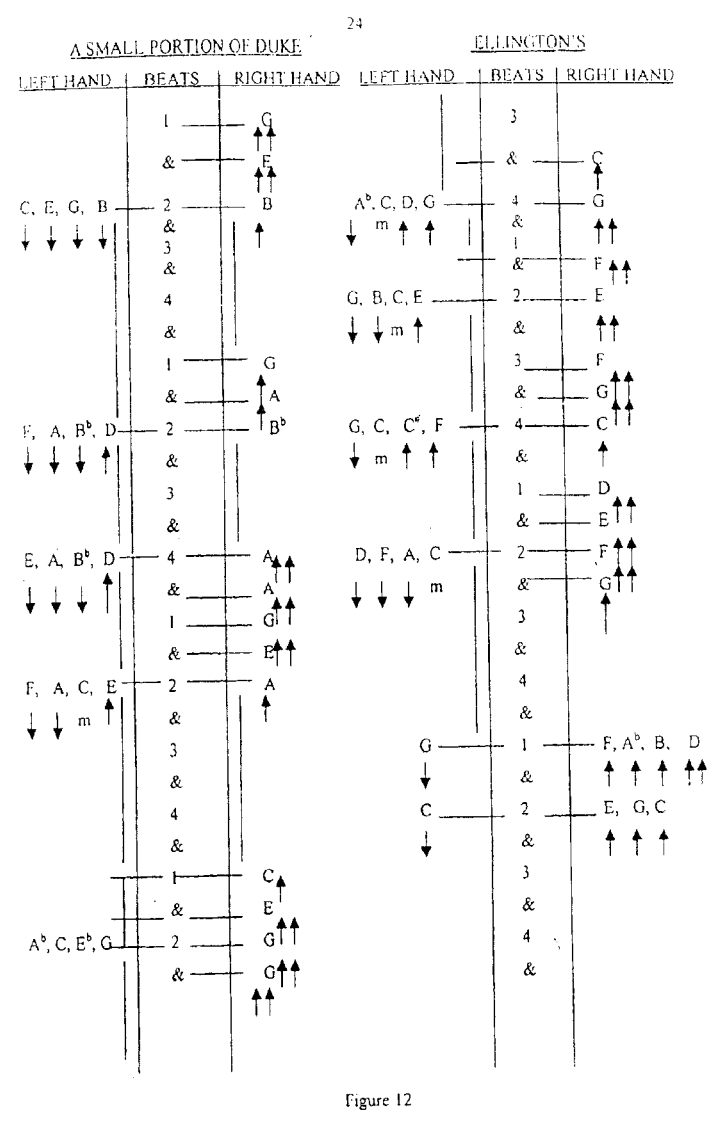

Finally in FIG. 12 we have an arrangement for a small part of Duke Ellington's MISTY pitched in the key of C-major and to be played at a moderate speed. Once again the tools of the invention are put to use in order to maintain the rhythm and texture of the song.

I claim:

1. A method of writing keyboard music comprising the steps of:
   a) constructing a column providing a right and left side to it;
   b) labeling the top of the right side of the column right hand, and labeling the top left side of the column left hand;
   c) writing all single piano notes and chords that are to be played using the right hand in the region under the right hand label and writing all low sounding bass notes, non low sounding single piano notes and chords to be played using the left hand in the region under the left hand label;
   d) representing a chord by writing down the exact notes that make up the chord, separated by commas;
   e) drawing a horizontal bar across the centerline dividing the column as an indicator showing the particular music in the right region of the column to be played at the same time the music in the left side of the column is played;
   f) representing alternatives to first choice chords, single notes or bass notes by drawing a slanted bar directly adjacent to the first choice single note, bass or chord, then on the other side of the bar writing in the alternative single note, bass or chord;
   g) representing single notes, bass notes or chords that are to be sustained by drawing a vertical bar directly below the specific single note, bass note or chord to be sustained;
   h) writing recommended fingering for specific keyboard notes by writing a finger number next to or under the note or notes;
   i) indicating where on the keyboard to hit a particular note by drawing an arrow or arrows under said note as a clue to said keyboard note's proximity to the middle C note on the keyboard;
   j) indicating rhythm by writing the exact 1,2,3,4, or whatever beat in a center column on the music column, and then writing the chords, notes or bass notes on the exact, precise beat written in the center column.

* * * * *